(12) United States Patent
Oyama et al.

(10) Patent No.: US 6,199,982 B1
(45) Date of Patent: Mar. 13, 2001

(54) PRESBYOPIA CORRECTION CONTACT LENS

(75) Inventors: Hiroyuki Oyama, Kakamigahara; Tadashi Sawano; Kazuya Miyamura, both of Aichi-ken; Asaki Suzaki, Kasugai, all of (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 09/382,065

(22) Filed: Aug. 24, 1999

(30) Foreign Application Priority Data

Aug. 26, 1998 (JP) .................................. 10-240613

(51) Int. Cl.[7] .................................. G02C 7/04; G02C 7/02
(52) U.S. Cl. ..................... 351/161; 351/176; 351/177
(58) Field of Search .................................. 351/161, 160 R, 351/160 H, 162, 176–177; 623/6.27–6.28

(56) References Cited

U.S. PATENT DOCUMENTS

| | | | |
|---|---|---|---|
| 4,593,981 | 6/1986 | Scilipoti | 351/161 |
| 4,618,227 | 10/1986 | Bayshore | 351/161 |
| 4,636,049 | 1/1987 | Blaker | 351/161 |
| 5,002,382 | * 3/1991 | Seidner | 351/161 |
| 5,422,687 | * 6/1995 | Tanaka et al. | 351/161 |
| 5,428,412 | 6/1995 | Stoyan | 351/177 |
| 5,805,260 | * 9/1998 | Roffman et al. | 351/161 |

FOREIGN PATENT DOCUMENTS

| | | |
|---|---|---|
| 0 618 474 A1 | 10/1994 | (EP) . |
| 0 646 825 A1 | 4/1995 | (EP) . |
| 57-105717 | 7/1982 | (JP) . |

\* cited by examiner

Primary Examiner—Georgia Epps
Assistant Examiner—Jordan M. Schwartz
(74) Attorney, Agent, or Firm—Burr & Brown

(57) ABSTRACT

Presbyopia correction contact lens including an optical zone consisting of a substantially circular central optical portion and an annular peripheral optical portion outside the central optical portion, the central and peripheral optical portions having respective different optical power values, so that the central and peripheral optical portions provide one and the other of a near vision correction region and a distant vision correction region, respectively, wherein the central and peripheral optical portions provide the near and distant vision correction regions, respectively, and the optical zone includes a front surface having an arcuate configuration with a substantially constant curvature in cross section taken in a plane parallel to a diametric direction of the contact lens, and a back surface consisting of a central portion corresponding to the central optical portion and a peripheral portion corresponding to the peripheral optical portion, the central portion of the back surface having an arcuate configuration with a substantially constant curvature in cross section taken in said plane, which curvature is different from that of the peripheral portion of the back surface.

17 Claims, 9 Drawing Sheets

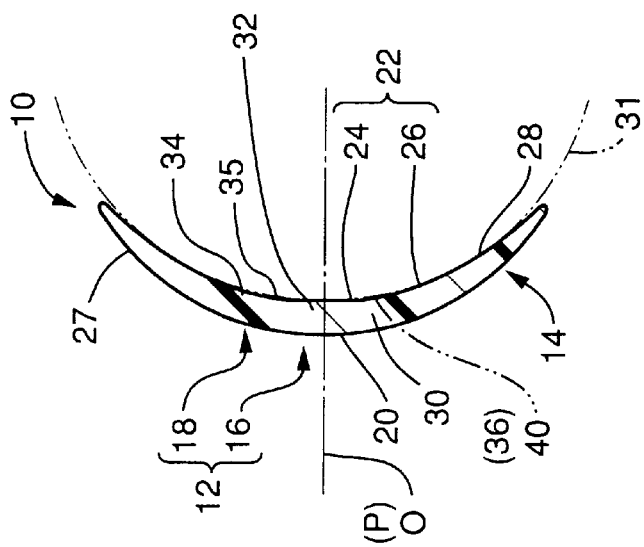
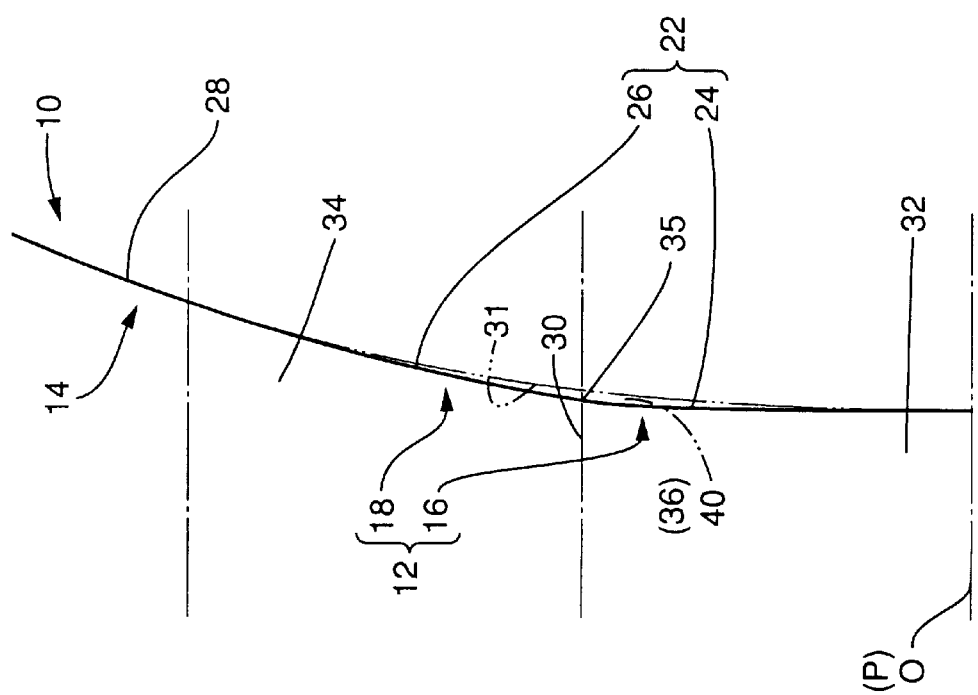

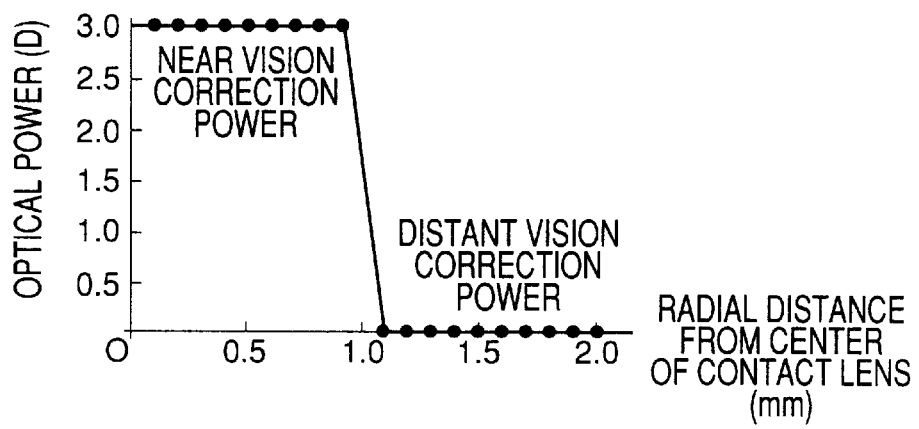
FIG. 10(a) CONTACT LENS
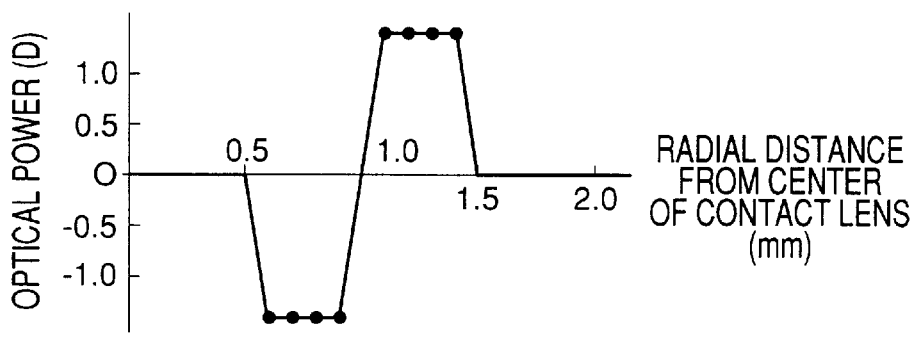
FIG. 10(b) LACRIMAL LENS
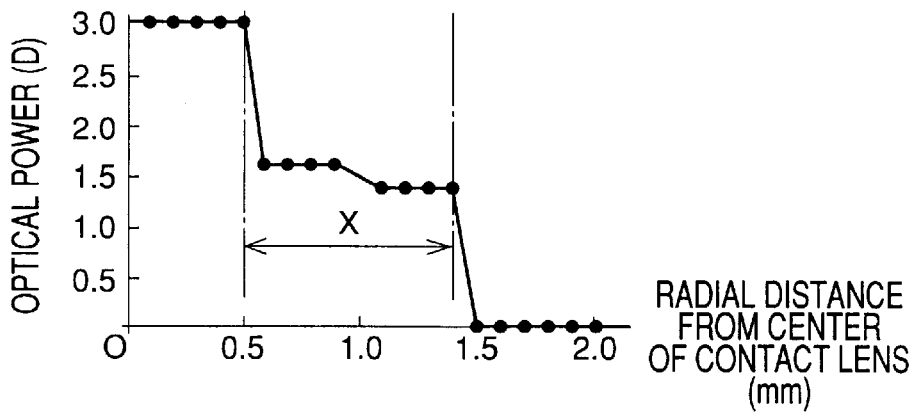
FIG. 10(c) CONTACT LENS + LACRIMAL LENS

PRESBYOPIA CORRECTION CONTACT LENS

The present application is based on Japanese Patent Application No. 10-240613 filed Aug. 26, 1998, the content of which is incorporated hereinto by reference.

BACKGROUND OF THE INVENTION

1. Field of the Invention

The present invention relates to a presbyopia correction contact lens whose optical portions respectively provide a near vision correction region and a distant vision correction region having a common optical center.

2. Discussion of the Related Art

As a contact lens for vision correction of an eye suffering from decreasing accommodation, such as presbyopia, there has been proposed a multifocal-type presbyopia correction contact lens having a plurality of vision correction regions which provide respectively determined mutually different optical powers. The multifocal-type presbyopia correction contact lens is generally classified into two types: an alternating or translating vision type contact lens, wherein the vision correction regions including a near and a distant vision correction region are selectively and alternatively used as needed in observing objects, with a shift of the visual axis of the lens user; and a simultaneous vision type contact lens, wherein the vision correction regions are simultaneously used, and a desired image observed through one of the vision correction regions is selected by an action of the lens wearer's brain. In the field of contact lenses, the simultaneous vision type contact lens prevails over the alternating vision type contact lens since it is rather difficult to select an appropriate vision correction region for observing the object at a desired distance.

As one example of the simultaneous vision type presbyopia correction contact lens, there is proposed a so-called bifocal contact lens having two focal points which respectively correspond to the near and distant vision correction regions.

U.S. Pat. No. 4,636,049 discloses one example of the bifocal contact lens, wherein the back surface of the optical zone of the lens, i.e., a cornea-contacting surface, serves as a base curved surface having a profile corresponding to that of the cornea of the lens user's eye, and two concentric regions having respective different radii of curvature are formed on the front surface of the optical zone, so that the two concentric regions provide two optical portions which serve as one and the other of the near and distant vision correction regions.

The bifocal contact lens constructed as described above, however, tends to suffer from various problems such as ghosting or double imaging, and mutual interference of the images obtained through the near and distant vision correction regions, since a bend on which a point of change of the curvature lies is present at a boundary of the two optical portions, and the optical power abruptly changes between the values of the near and distant vision correction regions at the boundary. In the bifocal contact lens disclosed in the above publication, the bend or discontinuity at the boundary of the two optical portions is present on the front surface of the contact lens. Accordingly, the contact lens undesirably suffers from a flare resulting from a large difference between the refractive indices of the contact lens and the air, thereby causing scattering of light.

In the bifocal contact lens disclosed in the above publication, the near vision correction power and distant vision correction power are provided by forming, on the front surface of the contact lens, the two optical portions having different respective curvatures. When the contact lens is formed by a molding operation using a mold assembly consisting of a female mold and a male mold which respectively give the front surface and the back surface of the contact lens, it is necessary to prepare a large number of different female molds giving different front surfaces of the contact lens by polymerization of a lens material in the mold assembly, depending upon different combinations of the near and distant vision correction powers to be given to different contact lenses. This undesirably pushes up the cost of manufacture of the contact lens.

JP-A-57-105717 discloses another example of the bifocal contact lens, wherein two concentric regions having different radii of curvature are formed on the back surface of the optical zone of the contact lens, so that the distant vision correction region is provided by one of the two concentric regions which corresponds to a central optical portion, while the near vision correction region is provided by the other concentric region which corresponds to a peripheral optical portion. The thus constructed contact lens also suffers from the ghosting or double imaging problem in observing the objects, arising from the bend or discontinuity at the boundary of the two optical portions.

In the contact lens disclosed in the above publication, the radius of curvature of the back surface of the central optical portion is made considerably smaller than that of the back surface of the peripheral optical portion. Due to a large difference between the radii of curvature of the respective back surfaces of the two optical portions, a large amount of tear fluid tends to be accumulated between the back surface of the central optical portion of the contact lens and the corneal surface of the lens user's eye. In this case, the optical power of the contact lens during its use on the lens user's eye tends to fluctuate due to refraction of light caused by the tear fluid. Accordingly, the contact lens does not provide the intended optical power. Further, the cornea of the lens user's eye undesirably deforms so as to follow the configuration of the back surface of the central optical portion of the contact lens while the contact lens is worn on the eye, deteriorating the wearing comfort of the contact lens and causing cornea trouble.

SUMMARY OF THE INVENTION

It is therefore a first object of the present invention to provide a presbyopia correction contact lens which assures good wearing comfort and which achieves excellent vision correction performance with high stability.

It is a second object of the invention to provide a method of designing a presbyopia correction contact lens which assures a high degree of clearness of images of both near and distant objects.

It is a third object of the invention to provide a method of producing a presbyopia correction contact lens in a highly economical manner.

The above-indicated first object of the present invention may be attained according to a first aspect of the invention, which provides a presbyopia correction contact lens including an optical zone which consists of a substantially circular central optical portion and an annular peripheral optical portion which is radially outwardly of the central optical portion, the central and peripheral optical portions having respectively determined mutually different optical power values, so that the central and peripheral optical portions provide one and the other of a near vision correction region and a distant vision correction region, respectively, the contact lens being characterized in that: the central optical portion provides the near vision correction region while the peripheral optical portion provides the distant vision correction region, the optical zone including a front surface having a generally arcuate configuration with a substantially constant degree of curvature in cross section taken in a plane parallel to a diametric direction of the contact lens, and a back surface consisting of a central portion corresponding to the central optical portion and a peripheral portion corresponding to the peripheral optical portion, the central portion of the back surface having a generally arcuate configuration with a substantially constant degree of curvature in cross section taken in the plane, which curvature is different from that of the peripheral portion of the back surface.

In the presbyopia correction contact lens constructed as described above, the near vision correction region is provided by the central optical portion, so that a difference between the degrees of curvature, i.e., the radii of curvature, of the central portion of the back surface corresponding to the central optical portion and the peripheral portion of the back surface corresponding to the peripheral optical portion is made relatively small. This arrangement is effective to prevent the cornea of the lens user's eye from deforming along or following the configuration of the back surface of the optical zone of the contact lens, to thereby prevent deterioration of the wearing comfort felt by the lens user and avoid the risk of causing trouble of the cornea.

In the present presbyopia correction contact lens wherein the difference between the degrees of curvature of the central and peripheral portions of the back surface of the optical zone is made small, a clearance formed between the back surface of the optical zone of the contact lens and the corneal surface of the lens user's eye when the contact lens is worn on the lens user's eye has a small axial dimension, thereby accordingly reducing the thickness of a tear fluid layer present in the clearance formed as described above. This arrangement is effective to reduce refraction of light by the tear fluid layer, so as to prevent a variation or fluctuation of the optical power of the contact lens during its use on the user's eye. Accordingly, the present contact lens provides the intended optical power with high stability.

In the presbyopia correction contact lens constructed as described above, the distant vision correction power is given to the contact lens by suitably determining the degree of curvature of the front surface of the optical portion, while the near vision correction power is given to the contact lens by suitably determining the degree of curvature of the central portion of the back surface corresponding to the central optical portion. This arrangement does not require a large number of different molds to be used in the molding operation for molding both of the opposite surfaces of the contact lens, resulting in reduction of the cost of manufacture of the contact lens.

In a first preferred form of the above first aspect of the invention, the degree of curvature of the central portion of the back surface corresponding to the central optical portion is made smaller in all diametric directions of the contact lens than that of the peripheral portion of the back surface corresponding to the peripheral optical portion, and the back surface of the optical zone is formed so as to be spaced apart from a corneal surface of an eye of a lens user at and in the vicinity of a boundary between the central and peripheral optical portions, so as to form a clearance between the back surface and the corneal surface, which clearance has a predetermined radial width corresponding to adjacent radial end sections of the central and peripheral optical portions.

According to this arrangement, when the contact lens is worn on the eye of the lens user, the tear fluid layer is formed between the back surface of the optical zone of the lens and the corneal surface of the lens user's eye at and in the vicinity of the boundary or junction of the central and peripheral optical portions. This tear fluid layer has a small axial thickness or dimension and continuously extends in the circumferential direction of the contact lens. In the present invention, the tear fluid layer formed as described above is utilized as a tear lens, and the optical power to be provided by the tear lens is combined with the optical power to be provided by the contact lens, so that the contact lens provides, at and near the boundary of the central and peripheral optical portions, an appropriate optical power intermediate between the near vision correction power of the central optical portion and the distant vision correction power of the peripheral optical portion. The thus formed contact lens does not suffer from an undesirable abrupt change of the optical power at and near the boundary of the central and peripheral optical portions, to thereby minimize or avoid the conventionally experienced ghosting or double imaging problem. In the present contact lens, a bend is formed on its back surface, at the boundary of the central and peripheral optical portions, and the tear fluid layer is formed at and in the vicinity of the bend between the corneal surface and the back surface of the contact lens when the contact lens is worn on the eye. The thus formed contact lens is less likely to suffer from the flare since the index of refraction of the tear fluid layer is close to that of the contact lens. Accordingly, the present contact lens permits clear imaging or viewing of the objects.

In the presbyopia correction contact lens constructed as described above, the back surface of the optical zone may be formed so as to be spaced apart from the corneal surface at a radially inner region of the central optical portion, or over the entire area of the central optical portion. Preferably, the back surface of the optical zone is formed so as to be held in close contact with the corneal surface at a radially inner region of the central optical portion and a radially outer region of the peripheral optical portion. This arrangement is effective to reduce the amount of the tear fluid staying between the back surface of the contact lens and the corneal surface, and to reduce the thickness of the tear lens provided by the tear fluid, thereby reducing refraction of light by the tear lens. In other words, the optical power exhibited by the tear lens is advantageously made small, so that the contact lens with the tear lens can provide the desired optical power with high stability during its use on the user's eye. Further, the refractive powers respectively determined for the central and peripheral optical portions can be obtained with high stability at both of the radially inner region of the central optical portion and the radially outer region of the peripheral optical portion, which regions are held in close contact with the corneal surface.

In another preferred form of the above first aspect of the invention, either one of the front surface and the back surface of the optical zone has a toric portion corresponding to at least one of the central and peripheral optical portions. The contact lens constructed according to the present form of the invention is capable of correcting the vision of the eye suffering from astigmatism in addition to presbyopia.

In still another preferred form of the above first aspect of the invention, the optical zone further includes an intermediate optical portion located between the central and peripheral optical portions, the intermediate optical portion providing an optical power value which is intermediate between the mutually different optical power values of the central and peripheral optical portions, and having a radial width of 0.1–2.0 mm.

The intermediate optical portion formed as described above effectively prevents the optical power of the contact lens from abruptly changing from the value of the central optical portion to the value of the peripheral optical portion, so that the ghosting or double imaging can be effectively avoided. The optical power distribution in the intermediate optical portion is determined such that the intermediate optical portion has the optical power which is intermediate between the near vision correction power of the central optical portion and the distant vision correction power of the peripheral optical portion. For instance, the optical power of the intermediate optical portion may change in steps in the diametric direction of the contact lens. Alternatively, the optical power of the intermediate optical portion may smoothly and continuously change in the diametric direction.

In yet another preferred form of the above first aspect of the invention, the central optical portion has a diameter of 0.6–3.0 mm. In this arrangement, the amount of light incident upon the contact lens through the near and distant vision correction regions is sufficient for observing near and distant objects. Accordingly, the present contact lens assures clear viewing of both of the near and distant objects.

In a further preferred form of the above first aspect of the invention, the optical zone has an optical center which is offset by a distance of not larger than 2.0 mm from a vertical line passing a geometrical center of the contact lens, in a direction toward a side portion of the contact lens, which side portion is to be located on the side of a nose of the lens user when the contact lens is worn on the eye of the lens wearer.

It is generally known that the pupil is offset from the center of the cornea on the nasal side, and that the contact lens tends to be positioned at a portion of the cornea on the side of the ear. Since the optical center of the optical zone of the present contact lens is offset from its geometric center in the lateral direction, in other words, toward the nose of the lens user when the contact lens is worn on the eye, the optical center of the contact lens is located substantially on the center of the pupil of the user's eye, namely, the optical axis of the contact lens is substantially aligned with the visual axis of the eye. The thus formed contact lens assures enhanced viewing of the objects observed through both of the near and distant vision correction regions.

In yet another preferred form of the above first aspect of the invention, the contact lens includes rotation preventive means for preventing the contact lens from rotating on the corneal surface while the contact lens is worn on the eye of the lens user. Owing to the rotation preventive means, the contact lens can be easily positioned on the cornea of the lens user's eye with a predetermined circumferential orientation thereon while preventing the contact lens from rotating in the circumferential direction. The present arrangement permits excellent vision correction with high stability especially where the contact lens is a toric lens having a cylindrical optical power, or where the contact lens has an optical center offset from its geometrical center as described above.

The above-indicated second object of the present invention may be attained according to a second aspect of the invention, which provides a method of designing a presbyopia correction contact lens according to the above first aspect of the invention, comprising the steps of: calculating an optical power value of a tear lens, on an assumption that the tear lens is formed in the clearance between the back surface of the optical zone of the contact lens and the corneal surface, with the clearance being filled with a tear fluid when the contact lens is worn on the eye of the lens wearer; and determining the optical power values of the central and peripheral optical portions by taking into account the optical power value of the tear lens, so that the contact lens and the tear lens cooperate to provide a desired optical power distribution.

In the present method described above, the contact lens is designed while utilizing the tear fluid as a part of the lens for giving the intended optical power, which tear fluid has been conventionally considered as a cause of instability of the optical power of the contact lens. According to the present method, the configuration of the contact lens can be designed such that the tear lens provided by the tear fluid has a relatively small optical power, whereby the ghosting or double imaging and the flare can be avoided by utilizing the tear lens.

In one preferred form of the above second aspect of the invention, the method further comprises a step of designing the back surface of the optical zone such that the tear lens is to be formed between the back surface and the corneal surface at and in the vicinity of the boundary of the central and peripheral optical portions, so as to have a predetermined radial width corresponding to the adjacent radial end sections of the central and peripheral optical portions, and such that the contact lens cooperates with the tear lens to provide, at the boundary, an optical power which is intermediate between the mutually different optical power values of the central and peripheral optical portions.

According to the above form of the invention, the contact lens is designed such that the tear lens is formed at and in the vicinity of the boundary of the central and peripheral optical portions when the contact lens is worn on the eye of the lens user. The thus designed contact lens provides, at the boundary of the two optical portions, an appropriate optical power which is intermediate between the near vision correction power of the central optical portion and the distant vision correction power of the peripheral optical portion, by combining the optical power of the tear lens and the optical power of the contact lens. Accordingly, the present method permits designing of the presbyopia correction contact lens which is less likely to suffer from the ghosting or double imaging and the flare.

The above-indicated third object of the present invention may be attained according to a third aspect of the invention, which provides a method of producing a presbyopia correction contact lens according to the above first aspect of the invention, comprising a step of molding at least one of the front and back surfaces of the optical zone.

The present method described above permits production of the presbyopia correction contact lens in a reduced number of process steps, as compared a method in which the surfaces of the contact lens are formed by a cutting operation. Further, the present method permits production of a large number of different types of presbyopia correction contact lenses by using a smaller number of different kinds of molds, minimizing the cost of its manufacture.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 3(a) is an elevational view in cross section of the presbyopia correction contact lens of FIG. 1 during its use on the eye of the lens user;

FIG. 3(b) is an enlarged view in cross section of the presbyopia correction contact lens of FIG. 1 during its use on the eye of the lens user, the view showing a principal part of the back surface of the contact lens;

FIGS. 10(a)–10(c) are graphs for explaining one example of designing the optical power distribution of the presbyopia correction contact lens of FIG. 1 when the contact lens is worn on the eye of the lens user.

DETAILED DESCRIPTION OF PRESENTLY PREFERRED EMBODIMENTS

Figure 1:
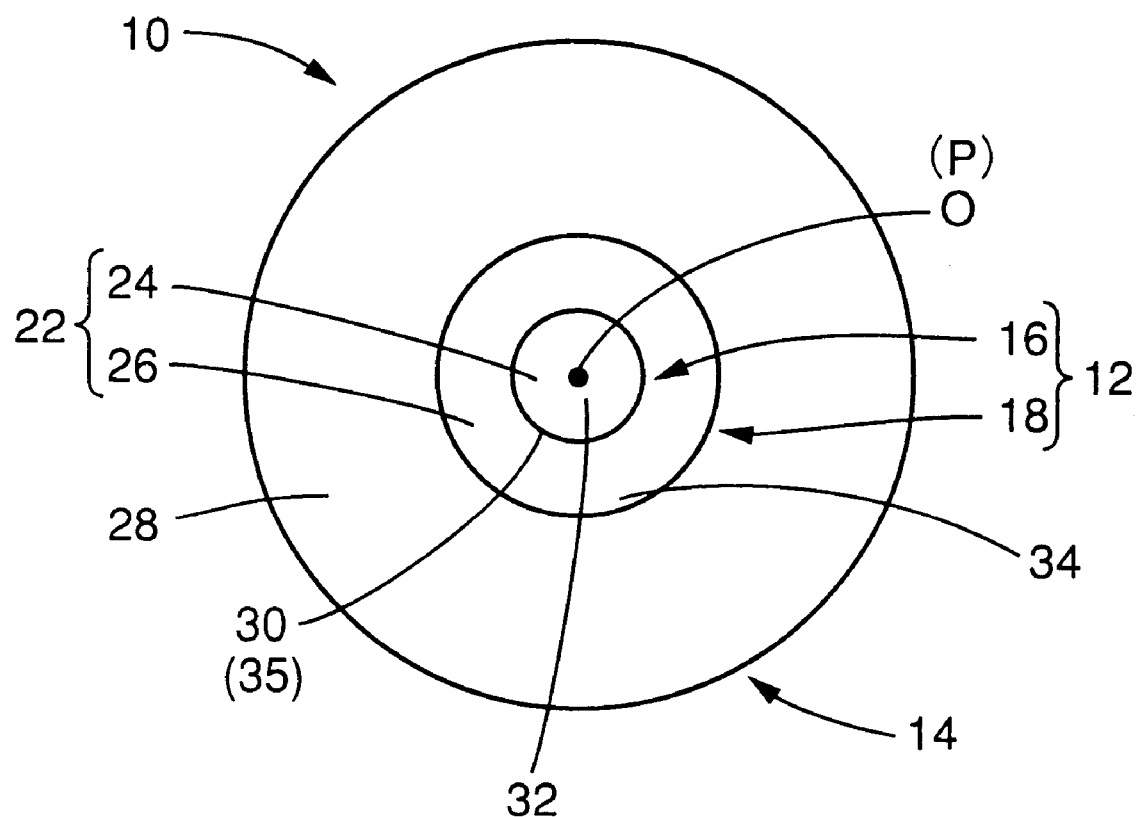
FIG. 1 is a view showing a back surface of a presbyopia correction contact lens constructed according to a first embodiment of the present invention.
Figure 2:
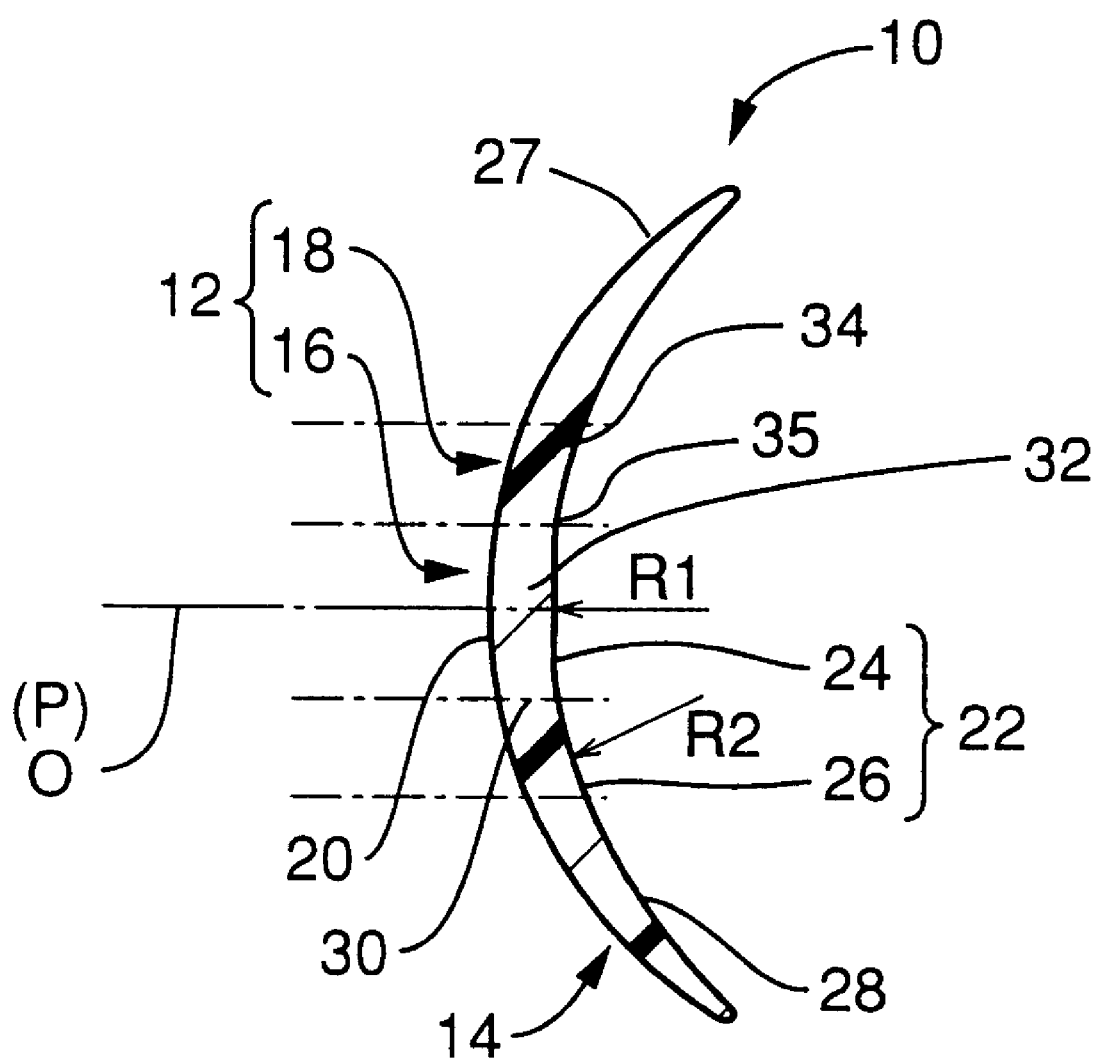
FIG. 2 is an elevational view in cross section of the presbyopia correction contact lens of FIG. 1.

Referring first to FIGS. 1 and 2, there is shown a presbyopia correction contact lens 10 constructed according to one embodiment of the present invention. This presbyopia correction contact lens 10 includes an optical zone 12 whose optical center P is aligned with a geometrical center O of the lens, which is a center of a circle defined by the periphery of the lens. The presbyopia correction contact lens 10 further includes a non-optical zone 14 located radially outwardly of the optical zone 12. The non-optical zone 14 is not to be positioned on the pupil of the eye of the lens user when the contact lens 10 is worn on the eye. Accordingly, this non-optical zone 14 does not have any optical vision correction effect, but is provided for easy and stable fitting of the contact lens 10 on the eye.

The optical zone 12 includes a circular central optical portion 16 having a center on the above-described optical center P, and an annular peripheral or outer optical portions 18 located concentrically with and radially outwardly of the central optical portion 16. The optical centers and the geometrical centers of these two optical portions 16, 18 are substantially aligned with the optical center P. The central and peripheral optical portions 16, 18 provide respectively determined mutually different values of optical power.

The central optical portion 16 is used as a near vision correction region which provides a constant vision correction power over its entire radial dimension for correcting the user's near vision, while the peripheral optical portions 18 is used as a distant vision correction region which provides a constant vision correction power over its entire radial dimension for correcting the user's distant vision. The near and distant vision correction regions respectively provide desired near and distant vision correction powers when the contact lens 10 is worn on the user's eye.

As shown in FIG. 2, the optical zone 12 consisting of the central and peripheral optical portions 16, 18 has a front surface 20 having an arcuate configuration with a desired degree of curvature as seen in the cross sectional view of FIG. 2 (in cross section taken in a plane parallel to the diametric direction of the lens 10). The degree of curvature of the front surface 20 is substantially constant in all diametric directions of the lens 10. The optical zone 12 further has a back surface 22 consisting of a central portion 24 corresponding to the central optical portion 16 and a peripheral portion 26 corresponding to the peripheral optical portions 18. The central portion 24 of the back surface 22 has an arcuate configuration whose degree of curvature is different from that of the peripheral portion 26 of the back surface 22. That is, a radius of curvature R1 of the central portion 24 of the back surface 22 corresponding to the central optical portion 16 is larger than a radius of curvature R2 of the peripheral portion 26 of the back surface 22 corresponding to the peripheral optical portions 18, so that the back surface 22 of the optical zone 12 cooperates with the front surface 20 of the optical zone 12 to permit the central and peripheral optical portions 16, 18 to function as the near and distant vision correction regions, respectively. The radius of curvature R1 of the central portion 24 and the radius of curvature R2 of the peripheral portion 26 are also substantially constant in all diametric directions of the contact lens 10. The front surface 20 of the optical zone 12, the central and peripheral portions 24, 26 of the back surface 22 of the optical zone 12 have the respective different radii of curvature which are constant in all diametric directions of the contact lens 10.

In the present embodiment, the peripheral portion 26 of the back surface 22 corresponding to the peripheral optical portions 18 has a curvature which substantially corresponds to that of the corneal surface of the lens user's eye, and functions as a so-called base curved surface. The curvature of the front surface 20 of the optical zone 12 is determined such that the front surface 20 cooperates with the above-described peripheral portion 26 of the back surface 22, i.e., the base curved surface, to permit the peripheral optical portions 18 to exhibit a desired distant vision correction power. Further, the curvature of the central portion 24 of the back surface 22 is determined such that the central portion 24 of the back surface 22 cooperates with the front surface 20 having the curvature determined as described above, to permit the central optical portion 16 to exhibit a desired near vision correction power. The configurations of front and back surfaces 27, 28 of the non-optical zone 14 are not particularly limited. In the present embodiment, however, the front surface 27 of the non-optical zone 14 except the edge portion of the lens 10 has a larger degree of curvature than the front surface 20 of the optical zone 12 in all diametric directions of the contact lens 10, while the back surface 28 of the non-optical zone 14 has a smaller degree of curvature than the peripheral portion 26 of the back surface 22 of the optical zone 12 (i.e., the base curved surface) in all diametric directions of the contact lens 10. The curvatures of the front and back surfaces 27, 28 of the non-optical zone 14 are substantially constant in all diametric directions of the contact lens 10. Further, the curvatures of the front and back surfaces 27, 28 of the non-optical zone 14 are suitably determined, so that the the edge portion of the contact lens 10 has a desired configuration.

As shown in FIGS. 3(a) and 3(b), in the contact lens 10 according to the present embodiment, the back surface 22 of the optical zone 12 is spaced apart from the corneal surface 31 at a boundary or junction 30 between the central optical portion 16 and the peripheral optical portions 18 over a suitable radial distance on the radially inner and outer sides of the boundary 30 when the contact lens 10 is worn on the eye of the lens user, as clearly shown in FIG. 3(b). The thus constructed contact lens 10 is held in close contact with the corneal surface 31 at a radially inner region 32 of the central optical portion 16 and a radially outer region 34 of the peripheral optical portions 18 during its use on the lens user's eye. In this arrangement, the back surface 22 of the optical zone 12 is spaced apart from the corneal surface 31 by a maximum axial distance at the boundary 30 i.e., at a bend 35 at which the curvature of the back surface 22 changes. Accordingly, while the contact lens 10 is worn on the eye of the lens user, there is formed a substantially fluid-tightly closed clearance 36 at and in the vicinity of the boundary 30 (bend 35) of the two optical portions 16, 18, between the back surface 22 of the optical zone 12 and the corneal surface 31. The clearance 36 has a generally triangular cross sectional shape as seen in FIG. 3(b). In the present embodiment wherein the respective curvatures of the central and peripheral portions 24, 26 of the back surface 22 of the optical zone 12 are made substantially constant in all radial direction of the contact lens 10, the clearance 36 has a suitable radial width which is constant in all diametric directions of the contact lens 10. In other words, the clearance 36 has a generally annular configuration having the, same cross sectional shape in all diametric directions of the lens 10 and extends continuously in the circumferential direction of the lens 10. In the present contact lens 10 wherein the central portion 24 of the back surface 22 has a smaller degree of curvature than the peripheral portion 26 of the back surface 22, which peripheral portion 26 has a configuration substantially following that of the corneal surface 31, the axial dimension of the generally annular clearance 36 can be made considerably small. For instance, the axial dimension of the clearance 36 is preferably not larger than 4 μm.

While the contact lens 10 constructed as described above is worn on the eye of the lens user, the above-described clearance 36 formed between the back surface 22 of the optical zone 12 and the corneal surface 31 is filled with the tear fluid present in the eye of the lens user, to thereby form a tear fluid layer therein. This tear fluid layer functions as a tear lens 40. The thus formed tear lens 40 has an annular configuration having a generally triangular cross sectional shape corresponding to the cross sectional shape of the clearance 36, as seen in FIG. 3(b), and has a suitable radial dimension corresponding to the adjacent radial end sections of the central and peripheral optical portions 16, 18 on the opposite radially inner and outer sides of the boundary 30 of the two optical portions 16, 18.

In the thus constructed contact lens 10, the diameter of the optical zone 12 (the outside diameter of the peripheral optical portion 18) is suitably determined depending upon the diameter of the pupil of the lens user's eye. The diameter of the central portion 24 of the back surface 22, in other words, the diameter of the central optical portion 16 is preferably 0.6–3.0 mm, more preferably 1.0–2.6 mm. If the diameter of the central optical portion 16 is smaller than 0.6 mm, the size of the near vision correction region is too small to obtain a sufficient amount of light required for correcting the lens user's near vision, resulting in an unsatisfactory near vision correction performance of the contact lens 10. On the other hand, if the diameter of the central optical portion 16 is larger than 3.0 mm, the size of the distant vision correction region for correcting the user's distant vision will be insufficient when the diameter of the pupil varies, for instance. In this case, the contact lens 10 does not exhibit a good distant vision correction performance.

In the present presbyopia correction contact lens 10 constructed as described above, the peripheral portion 26 of the back surface 22 of the optical zone 12 has a curvature substantially corresponding to that of the corneal surface 31, while the central portion 24 of the back surface 22 has a smaller degree of curvature than the peripheral portion 26 of the back surface 22. Accordingly, the difference of the curvatures, i.e., a difference of the radii of curvature R1 and R2, between the central portion 24 of the back surface 22 corresponding to the central optical portion 16 and the peripheral portion 26 of the back surface 22 corresponding to the peripheral optical portions 18 is made small in the present contact lens 10, as compared in the conventional contact lens as disclosed in JP-A-57-105717, wherein the degree of curvature of the back surface of the central optical portion is made larger than that of the back surface of the peripheral optical portion. The present contact lens 10, therefore, advantageously prevents deformation of the cornea following the back surface 22 of the optical zone 12, to thereby minimize or avoid a risk of deteriorating the wearing comfort of the contact lens or causing corneal trouble.

In the present contact lens 10, the central portion 24 of the back surface 22 of the optical zone 12 has a curvature which is smaller, in all diametric directions of the contact lens 10, than that of the peripheral portion 26 of the back surface 22, which has a profile substantially following that of the cornea. Accordingly, the above-described annular clearance 36 formed between the back surface 22 of the optical zone 12 and the corneal surface 31 during use of the contact lens 10 on the user's eye has a small axial dimension, resulting in reduction of refraction of light by the tear lens 40 formed in the clearance 36. In this arrangement, the tear lens 40 has a relatively small optical power. Accordingly, the optical power provided by a combination of the optical power value of the contact lens 10 and the optical power value of the tear lens 40 upon wearing of the contact lens 10 on the user's eye can be kept constant at a desired level, so that the contact lens 10 exhibits excellent vision correction capability with high stability.

In the present embodiment, when the contact lens 10 is worn on the user's eye, the tear lens 40 is formed at and adjacent to the boundary 30 of the central and peripheral optical portions 16, 18 between the back surface 22 of the lens 10 and the corneal surface 31, such that the tear lens 40 extends over a suitable radial distance covering the adjacent end sections of the two optical portions 16, 18. According to this arrangement, the contact lens 10 provides, at the boundary 30 of the central and peripheral optical portions 16, 18, an optical power which changes progressively, for example, between the near vision correction power of the central optical portion 16 and the distant vision correction power of the peripheral optical portions 18, by combining the optical powers of the contact lens 10 and the tear lens 40. This arrangement inhibits an abrupt change of the optical power at and near the boundary 30 of the two optical portions 16, 18, whereby the ghosting or double imaging is advantageously minimized or avoided. Since the bend 35 (a point at which the curvature changes) is present on the back surface of the contact lens 10, and the tear fluid layer, i.e., the tear lens 40, is formed at and adjacent to the bend 35 and between the back surface 22 of the optical zone 12 and the corneal surface 31, the contact lens 10 is less likely to suffer from a flare, owing to a small difference in the index of refraction between the contact lens 10 and the tear fluid. Accordingly, the present contact lens 10 constructed as described above is capable of assuring clear viewing of the objects during its use on the user's eye.

In the present embodiment, the back surface 22 of the optical zone 12 is held in close contact with the corneal surface 31 at the radially inner region 32 of the central optical portion 16 and the radially outer region 34 of the peripheral optical portions 18. Accordingly, the contact lens 10 stably exhibits the intended refraction powers of the central and peripheral optical portions 16, 18 respectively at those regions 32, 34 which are held in close contact with the corneal surface 31. Further, this arrangement is effective to reduce the amount of the tear fluid staying in the clearance 36 between the back surface 22 of the optical zone 12 and the corneal surface 31, so that the axial dimension of the tear lens 40 constituted by the tear fluid can be made significantly small, and the optical power provided by the tear lens 40 is accordingly made small, assuring stable vision correction performance of the contact lens 10.

The contact lens 10 according to the present invention is designed to give the desired near and distant vision correction powers, while taking into account an influence of the tear lens 40 formed in the clearance 36 between the back surface 22 of the optical zone 12 and the corneal surface 31.

Described in detail, the peripheral portion 26 of the back surface 22 functioning as the base curved surface is initially designed such that the peripheral portion 26 has an annular configuration with a constant degree of curvature corresponding to a degree of curvature of the corneal surface 31 of the lens user's eye, which degree of curvature of the corneal surface 31 is supposed to be constant in the present embodiment. Next, the front surface 20 of the optical zone 12 is designed to have an arcuate configuration with a constant degree of curvature in cross section of the lens 10 parallel to its diametric direction, such that the front surface 20 cooperates with the peripheral portion 26 of the back surface 22 designed as described above, to permit the peripheral optical portions 18 to exhibit the desired distant vision correction power. The degrees of curvature of the peripheral portion 26 and the front surface 20 of the optical zone 12 are constant in all diametric directions of the lens 10. Further, the central portion 24 of the back surface 22 is designed to have a circular configuration with a constant degree of curvature smaller than the degree of curvature of the peripheral portion 26 of the back surface 22, such that the central portion 24 of the back surface 22 cooperates with the front surface 20 of the optical zone 12 designed as described above, to permit the central optical portion 16 to exhibit the desired near vision correction power. Then, the front and back surfaces 27, 28 of the non-optical zone 14 are designed. In the present embodiment, the degree of curvature of the front surface 27 of the non-optical zone 14 except the edge portion of the lens is made larger in all diametric directions of the lens 10 than that of the front surface 20 of the optical zone 12, while the degree of curvature of the back surface 28 of the non-optical zone 14 is made smaller in all diametric directions of the lens than that of the peripheral portion 26 of the back surface 22 of the optical zone 12. Further, the degrees of curvature of the front and back surfaces 27, 28 of the non-optical zone 14 are made constant in all diametric directions of the contact lens 10. As needed, the configurations of the front and back surfaces 27, 28 of the non-optical zone 14 are designed such that the edge portion of the lens has a desired configuration.

In the present embodiment, the contact lens 10 is designed such that the central and peripheral portions 24, 26 of the back surface 22 of the optical zone 12 have respective different degrees of curvatures which are constant in all diametric directions of the lens 10, so that the generally annular clearance 36 to be formed between the back surface 22 of the optical zone 12 and the corneal surface 31 upon wearing of the contact lens 10 on the lens user's eye is formed at and adjacent to the boundary 30 of the central and peripheral optical portions 16, 18, so as to have a suitable radial width corresponding to the adjacent radial end sections of the two optical portions 16, 18, which width is constant in all diametric directions of the contact lens 10. Namely, the contact lens 10 is designed such that the tear lens 40 corresponding to the annular clearance 36 is formed between the back surface 22 of the optical zone 12 of the contact lens 10 and the corneal surface 31 upon wearing of the contact lens 10 on the lens user's eye, and such that the contact lens 10 cooperates with this tear lens 40 to provide, in the vicinity of the boundary 30, an optical power intermediate between the optical power values of the two optical portions 16, 18, namely, an appropriate optical power value intermediate between the near vision correction power of the central optical portion 16 and the distant vision correction power of the peripheral optical portions 18. Further, the contact lens 10 of the present embodiment is designed such that the back surface 22 of the optical zone 12 is held in close contact with the corneal surface 31 at the radially inner region 32 of the central optical portion 16 and the radially outer region 34 of the peripheral optical portions 18 during its use on the lens user's eye. The front surface 20 of the optical zone 12 is designed to have a degree of curvature which is constant in all diametric directions of the contact lens 10.

Thereafter, on the assumption that the tear lens 40 is formed upon wearing of the contact lens 10 on the lens user's eye, the optical power (optical power distribution) of the contact lens 10 designed as described above, and the configuration and the optical power (optical power distribution) of the tear lens 40 are calculated. Then, the contact lens 10 is redesigned by taking account of the optical power distribution of the tear lens 40, so that the intended optical power distribution is obtained.

Described more specifically, the optical power distribution during wearing of the contact lens on the user's eye is calculated as a combination of the optical powers of the contact lens 10 and the tear lens 40, on the basis of the respective optical power distributions of the contact lens 10 and the tear lens 40. Based on the calculated optical power distribution, the contact lens 10 is redesigned such that the contact lens 10 provides at the boundary 30 of the central and peripheral optical portions 16, 18 a desired optical power value intermediate between the optical power values of the two optical portions 16, 18. When it is desired to reduce the rate of change of the optical power at the boundary 30 with respect to the calculated optical power distribution, for instance, the diameter of the central portion 24 of the back surface 22 (i.e., the diameter of the central optical portion 16) is increased, or the degrees of curvature of the central and peripheral portions 24, 26 of the back surface 22 are reduced, so that the radial dimension of the tear lens 40, and accordingly the axial dimension of the tear lens 40 are increased For permitting the contact lens 10 to exhibit the optical power with high stability, the axial dimension of the tear lens 40 is preferably not larger than 4 μm.

When the desired sizes of the vision correction regions of the contact lens 10 are larger or smaller than those of the calculated optical power distribution, the central optical portion 16 or the peripheral optical portion 18 is redesigned in the following manner. Described more specifically, the redesigning of the central and peripheral optical portions 16, 18 is effected for changing the sizes of the vision correction regions giving the respective intended optical powers, in other words, for changing: 1) the size of an area in the central optical portion 16, which area is required for correcting the user's near vision (i.e., the size of the radially inner region 32 of the central optical portion 16, which is held in close contact with the corneal surface 31, in the present embodiment); and 2) the size of an area in the peripheral optical portion 18, which area is required for correcting the user's distant vision (i.e., the size of the radially outer region 34 of the peripheral optical portions 18, which is held in close contact with the corneal surface 31, in the present embodiment).

When it is desired to reduce the size of the near vision correction region (i.e., the size of the radially inner region 32 of the central optical portion 16 in this embodiment), with respect to that of the calculated optical power distribution, for instance, the degrees of curvature of the central and peripheral portions 24, 26 of the back surface 22 are initially increased, to thereby relocate or shift the tear lens 40 toward the central portion of the lens, and then the diameter of the central portion 24 of the back surface 22 is increased, to thereby adjust the rate of change of the optical power at and in the vicinity of the boundary 30 of the two optical portions 16, 18. Alternatively, the diameter of the central portion 24 of the back surface 22 is initially reduced, to thereby decrease the size of the near vision correction region, and then the degrees of curvature of the central and peripheral portions 24, 26 of the back surface 22 are reduced, to thereby adjust the rate of change of the optical power at and in the vicinity of the boundary 30.

In the redesigning procedure described above, depending upon the changes in the design of the central and peripheral portions 24, 26 of the back surface 22, the front surface 20 of the optical zone 12 is redesigned, and the central portion 24 of the back surface 22 is accordingly redesigned. Thus, the redesigning procedure is repeated until the intended optical power distribution of the contact lens 10 is obtained.

In the above redesigning procedure, the degree of curvature of the front surfaces 20 of the optical zone 12 and the degrees of curvature of the central and peripheral portions 24, 26 of the back surface 22 of the optical zone 12 are made constant in all diametric directions of the contact lens 10, and the annular tear lens 40 is formed at the boundary 30 over a suitable radial distance which is constant in all diametric directions of the contact lens 10. Further, the back surface 22 of the optical zone 12 is kept in close contact with the corneal surface 31 at the radially inner region 32 of the central optical portion 16 and the radially outer region 34 of the peripheral optical portion 18. When the degree of curvature of the peripheral portion 26 of the back surface 22 is changed in the redesigning procedure, the degree of curvature is preferably selected from among predetermined values of curvature of the base curved surface, e.g., from among predetermined six curvature values for a soft contact lens, for instance, so that the degree of curvature of the redesigned peripheral portion 26 of the back surface 22 corresponds to that of the cornea of the lens user's eye. When the diameter of the central portion 24 of the back surface 22, i.e., the diameter of the central optical portion 16, is changed in the redesigning procedure, the diameter is preferably in a range of 0.6–3.0 mm, more preferably 1.6–2.6 mm. Further, in changing the size of the vision correction region(s), the diameter of the near vision correction region, i.e., the radially inner region 32 of the central optical portion 16, which is held in close contact with the corneal surface 31, is preferably not larger than 2.6 mm, to avoid any trouble in observing the objects.

The present method permits designing of the configuration of the contact lens 10 such that the tear lens 40 has a relatively small optical power, on the assumption that the tear lens 40 is formed between the back surface 22 of the optical zone 12 and the corneal surface 31 during wearing of the contact lens 10 on the lens user's eye. According to the present method, the tear fluid layer which is conventionally considered to cause fluctuation of the optical power can be positively utilized as the tear lens. In the present embodiment, in particular, the contact lens 10 is designed such that the tear lens 40 (tear fluid layer) is formed between the back surface 22 of the optical zone 12 and the corneal surface 31 at the boundary 30, so as to have a suitable radial width corresponding to the adjacent radial end sections of the two optical portions 16, 18 when the contact lens 10 is worn on the lens user's eye. This arrangement is effective to reduce a flare at the boundary 30, owing to the presence of the tear fluid layer (tear lens 40). In the present method, the contact lens 10 is designed such that the tear lens 40 is formed at the boundary 30 as described above, and such that the contact lens 10 cooperates with the tear lens 40 to provide, at the boundary 30 of the two optical portions 16, 18, an optical power value intermediate between the values of the two optical portions 16, 18. Accordingly, the contact lens 10 is not adversely influenced by the bend at the boundary 30, and does not suffer from an abrupt change of the optical power at the boundary 30, minimizing or avoiding the ghosting or double imaging.

The thus designed contact lens 10 is produced based on the calculated values, by using known materials used for forming ordinary soft and hard contact lenses. While the present invention may be applicable to either of the soft and hard contact lenses, it is preferable that the contact lens 10 of the present invention be produced as the soft contact lens.

The contact lens 10 may be produced according to any known methods. For instance, the contact lens 10 is formed by a cutting operation on a lens blank, using a numerically controlled cutting device, for forming both of the opposite surfaces of the contact lens 10. Preferably, either one of the front and back surfaces 20, 22 of the optical zone 12 is formed by molding, and the other surface is formed by cutting. More preferably, both of the opposite surfaces of the contact lens 10 are substantially formed by molding.

In the present contact lens 10, the curvature of the front surface 20 of the optical zone 12 is determined so as to permit the peripheral optical portions 18 to exhibit the desired distant vision correction power, while the curvature of the peripheral portion 26 of the back surface 22 is determined so as to correspond to the curvature of the corneal surface 31, and the curvature of the central portion 24 of the back surface 22 is determined depending upon the desired near vision correction power. In this respect, when the contact lens 10 is produced by a molding operation using female and male molds, the total number of the female molds to be prepared is equal to the number of variations of the distant vision correction power, and the total number of the male molds to be prepared is equal to a product of the number of variations of the near vision correction power and the number of variations of the curvature of the base curved surface.

Described in detail by referring to an example of manufacture of a soft contact lens whose opposite surfaces are formed by molding, wherein the soft contact lens to be produced has a distant vision correction power selected from among fifty-three values, a near vision correction power selected from among four values, and has a base curved surface whose curvature is selected from among four values, the total number of the male molds to be prepared is equal to a product of the numbers of variations of the near vision correction power and the curvature of the base curved surface, namely, 4×4=16. The total number of the female molds to be prepared is equal to the number of variations of the distant vision correction power, namely, fifty-three. Accordingly, the number of the male and female molds to be prepared is equal to sixty-nine in total (16+53=69). In contrast, in producing the conventional contact lens as disclosed in JP-A-60-91327, wherein the two concentric regions having respective different radii of curvature are formed on the front surface of the lens, and wherein the back surface of the lens serves as a base curved surface having a constant single curvature, the total number of the male molds to be prepared is equal to the number of variations of the curvature of the base curved surface, namely, four in the above example, and the total number of the female molds to be prepared is equal to a product of the numbers of variations of the near vision correction power and the distant vision correction power, namely, 53×4=212 in the above example. Accordingly, the number of the male and female molds to be prepared is equal to two-hundred and sixteen in total (4+212=216). As is apparent from the above comparison, the required number of the molds used in producing the present contact lens 10 can be advantageously reduced when both of the opposite surfaces of the contact lens 10 are formed by molding, resulting in reduction of the cost of its manufacture.

While the present invention has been described in detail in its presently preferred embodiment, it is to be understood that the invention is not limited to the details of the illustrated embodiment.

In the contact lens 10 shown in FIG. 1, the optical center P of the optical zone 12 is aligned with the geometrical center O of the contact lens 10. However, the optical center P may be offset from the geometrical center O as described below.

Figure 4:
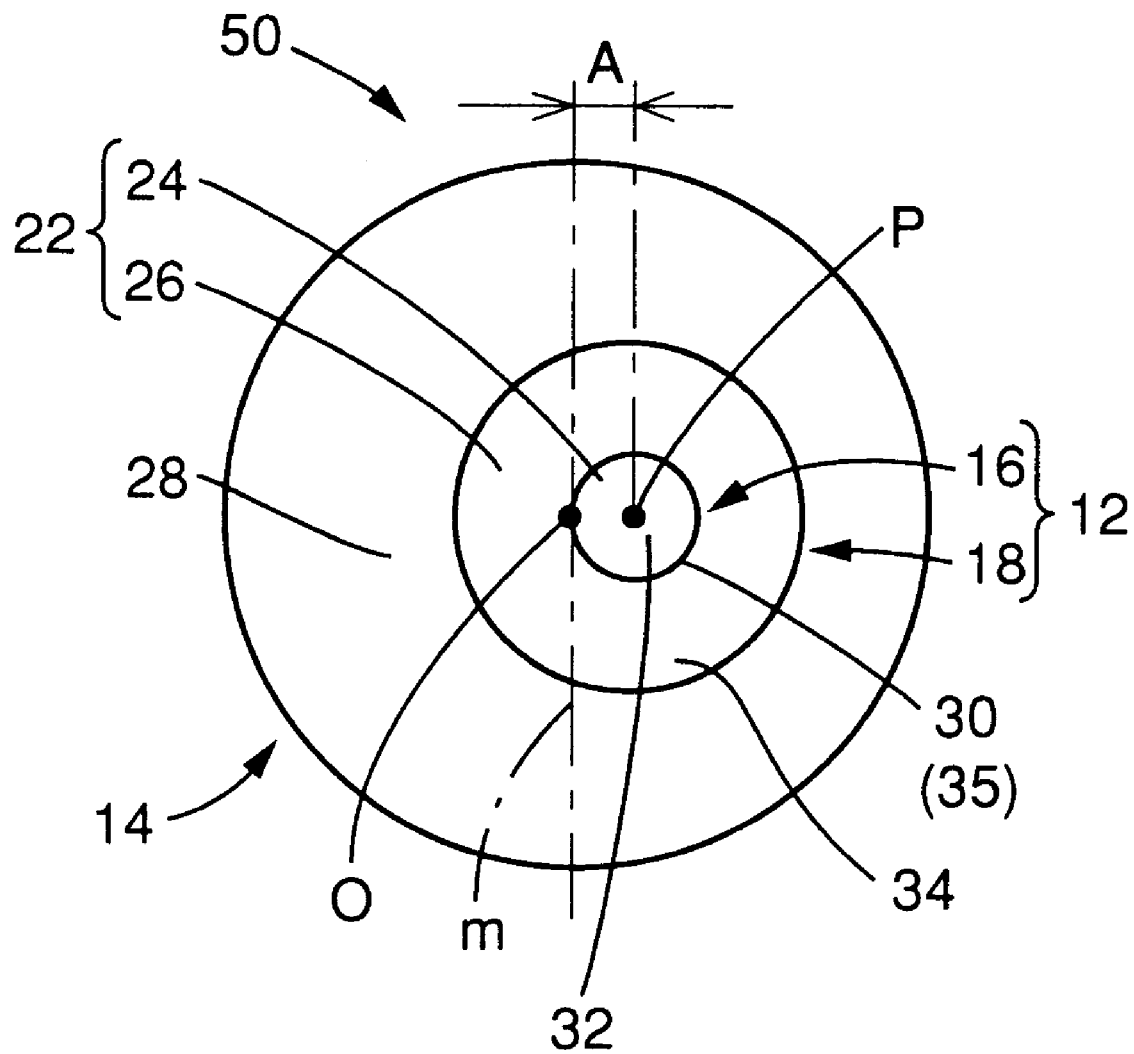
FIG. 4 is a view showing a back surface of a presbyopia correction contact lens constructed according to a second embodiment of the invention.

For instance, the optical center P of the optical zone 12 may be offset from the geometrical center O, as in a contact lens 50 shown in FIG. 4 constructed according to a second embodiment of the present invention. Namely, in the contact lens 50 of FIG. 4, the optical center P is offset by a distance A from the geometrical center O, in the lateral direction, i.e., in the right direction as seen in FIG. 4 (to the right of a vertical line m passing the center O), that is, on the side of the nose of the lens user when the contact lens 50 is worn on the lens user's eye. This arrangement is based on a fact that the contact lens tends to be positioned at a portion of the cornea on the side of the ear since the cornea of the human eye has a larger curvature at a portion on the side of the ear than the other portion on the side of the nose. Further, it is generally known that the center of the pupil of the human eye is offset from the center of the cornea on the nasal side. When the contact lens 50 whose optical center P is offset from its geometrical center O as described above is worn on the lens user's eye, the optical center P of the optical zone 12 is easily aligned with the center of the pupil, so that the contact lens 50 effectively achieves the intended near and distant vision correction functions. In the contact lens 50 of this embodiment, it is desirable that the offset distance A of the optical center P of the optical zone 12 from the geometric center O of the lens (i.e., from the vertical line m) in the lateral direction be 2.0 mm or smaller. In this second embodiment and the following third through fifth embodiments, the same reference numerals as used in the first embodiment are used to identify the corresponding components or elements, a detailed description of which is dispensed with.

Figure 5:
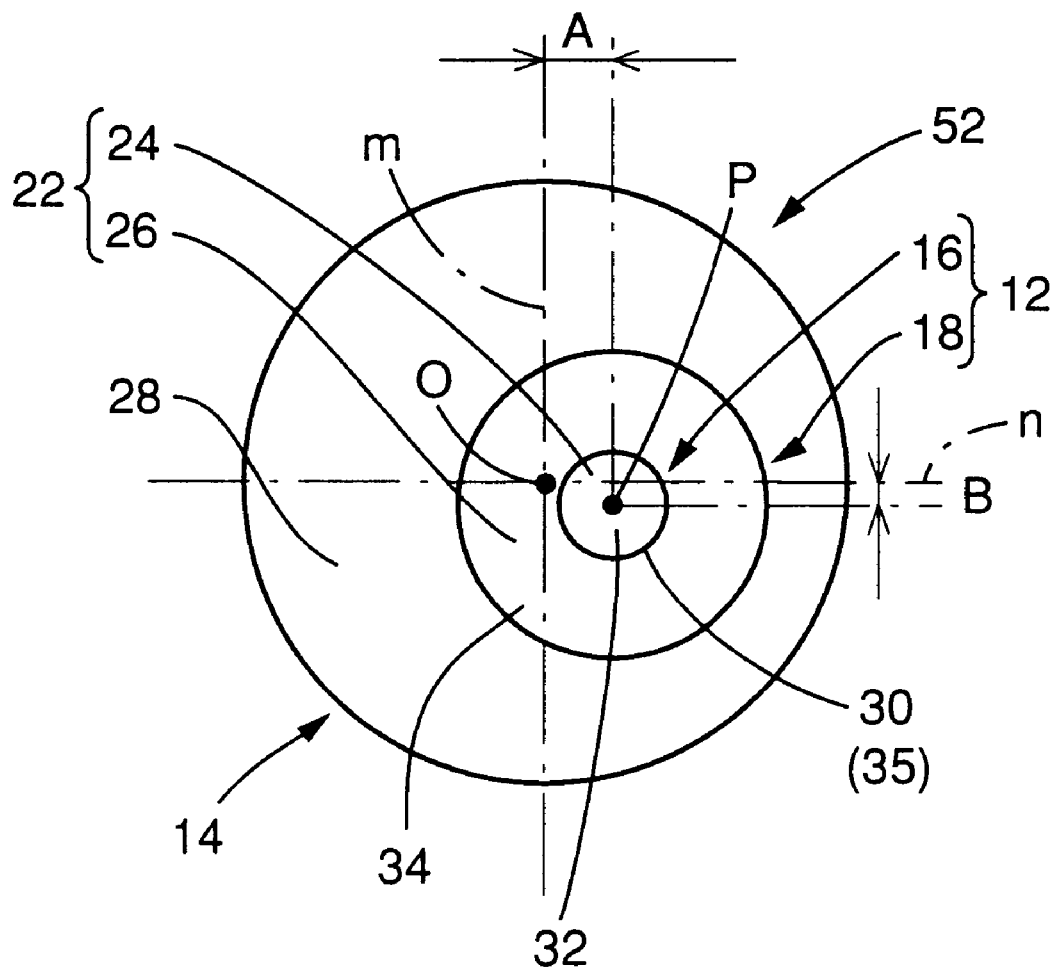
FIG. 5 is a view showing a back surface of a presbyopia correction contact lens constructed according to a third embodiment of the invention.

In the contact lens 50 of the above second embodiment, the optical center P of the optical zone 12 is offset from the geometrical center O, i.e., from the vertical line m, in the lateral direction on the side of the nose of the lens user. As in a contact lens 52 shown in FIG. 5, which is constructed according to the third embodiment of the present invention, the optical center P may also be offset from the geometrical center O in the downward direction. Described in detail, the optical center P is shifted by a distance B from the geometric center O (i.e., from a horizontal line n) in the downward direction, in view of a tendency that the visual axis of the lens wearer is usually directed downwards in the ordinary daily life. When the contact lens 52 whose optical center P is offset from its geometric center O as described above is worn on the user's eye, the contact lens 52 effectively achieves the intended vision correction function in the ordinary living environment. In this contact lens 52, too, it is desirable that the offset distance A of the optical center P from the vertical line m passing the geometrical center O in the lateral direction be 2.0 mm or smaller. Further, it is desirable that the offset distance B of the optical center P from the horizontal line n passing the geometrical center O in the downward direction be 4.0 mm or smaller. Alternatively, the optical center P may be offset from the geometrical center O, such that the optical center P is shifted on the side of the nose of the user, and is also shifted in the upward direction.

Figure 6:
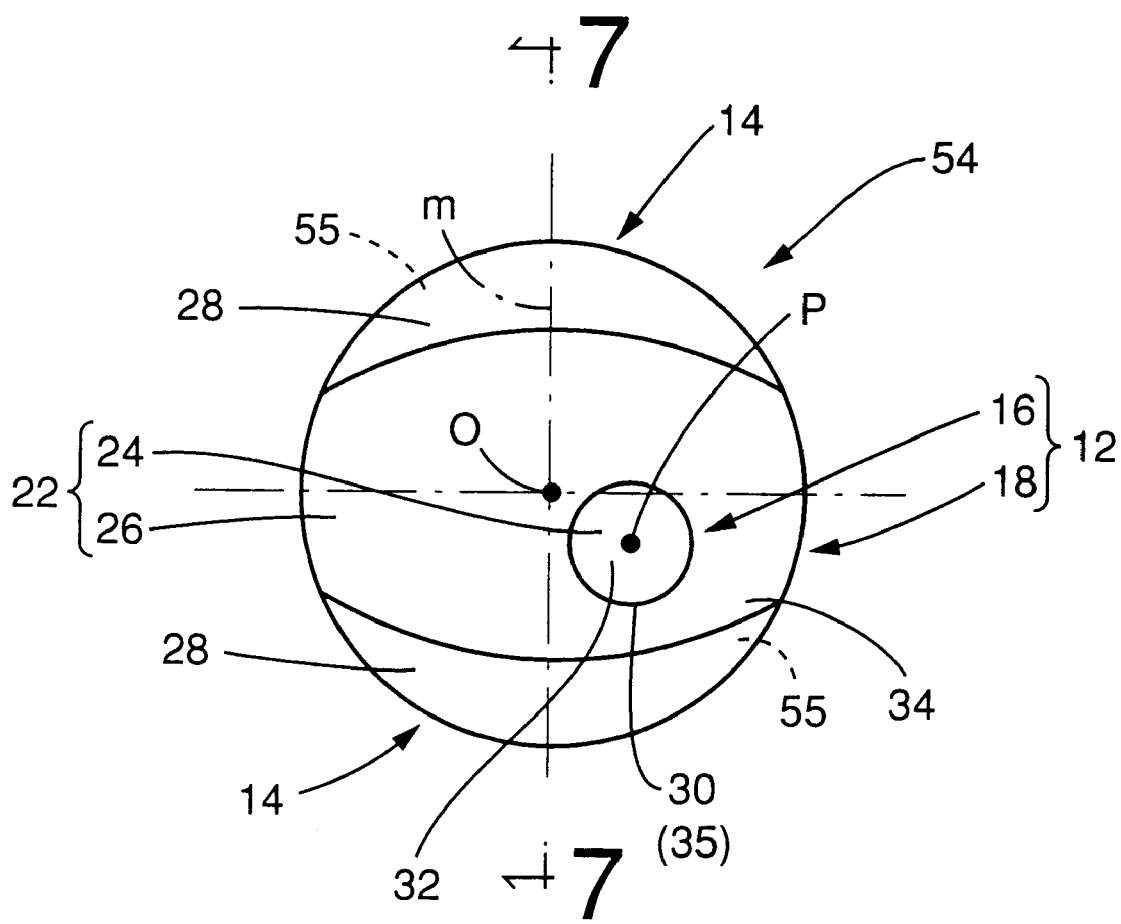
FIG. 6 is a view showing a back surface of a presbyopia correction contact lens constructed according to a fourth embodiment of the invention.
Figure 7:
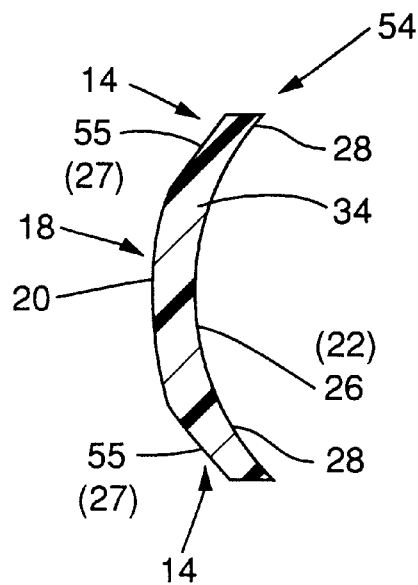
FIG. 7 is an elevational view in cross section, taken along line 7—7 of FIG. 6.

In the contact lenses 10, 50, 52 of the above first through third embodiments, the geometrical centers of the central and peripheral optical portions 16, 18 are aligned with each other. However, it is not necessary to align the geometrical centers of the two optical portions 16, 18 with each other, provided that the optical centers of the two optical portions are aligned with each other. While the central optical portion 16 has a circular configuration and the peripheral optical portions 18 has an annular configuration in the preceding embodiments, the central optical portion 16 may have an elliptical configuration and the peripheral optical portions 18 may have an elliptical annular configuration. Further, the geometrical center of the peripheral optical portions 18 need not be located on the optical center P of the optical zone, and the configuration of the peripheral optical portions 18 is not particularly limited, as long as the optical centers of the central and peripheral optical portions 16, 18 are aligned with each other. In the preceding embodiments, the peripheral optical portions 18 has an annular configuration whose center is aligned with the optical center P, and its geometrical center is aligned with the optical center P. As in a contact lens 54 shown in FIGS. 6 and 7 constructed according to a fourth embodiment of the present invention, the optical center P of the optical zone 12 with which the optical centers of the central and peripheral optical portions 16, 18 are aligned may be offset by a suitable distance from the vertical line m passing the geometrical center O of the lens, on the side of the nose of the lens user, and also in the downward direction. Further, in the contact lens 54, a lower and an upper thin-walled portion 55, 55 are formed as the non-optical zone 14 at the lower and upper portions of the peripheral optical portions 18, respectively, whereby the peripheral optical portions 18 assumes a generally elliptical configuration, and the geometrical center of the peripheral optical portions 18 is offset from the optical center P.

The front surface 20 of the optical zone 12, and the central and peripheral portions 24, 26 of the back surface 22 of the optical zone 12 may have an arcuate, elliptical or any other curved shapes, provided that these surfaces have the respective different degrees of curvature. However, the curvatures of these surfaces 20, 24, 26 are not necessarily made constant in all diametric directions of the lens. For instance, the contact lens may have respective different curvatures in cross sectional planes parallel to the vertical and horizontal directions when the contact lens is worn on the lens user's eye. For instance, either one of the front and back surfaces 20, 22 of the optical zone 12 may have a toric portion corresponding to at least one of the central and peripheral optical portions 16, 18. In this case, the contact lens is capable of correcting astigmatism as well as presbyopia.

Figure 8:
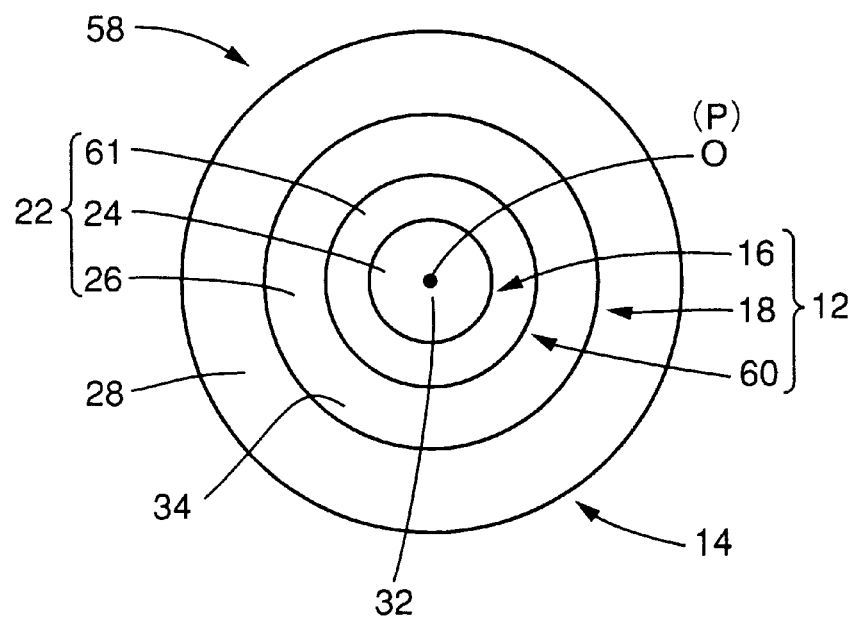
FIG. 8 is a view showing a presbyopia correction contact lens constructed according to a fifth embodiment of the invention.

In the preceding embodiments, the optical zone 12 consists of the central optical portion 16 used as the near vision correction region, and the peripheral optical portion 18 used as the distant vision correction region. As in a contact lens 58 shown in FIG. 8 constructed according to a fifth embodiment of the invention, the optical zone 12 may further include an intermediate optical portion 60 formed between the central and peripheral optical portions 16, 18 and having an optical power intermediate between the values of the two optical portions 16, 18. The intermediate optical portion 60 formed as described above is effective to prevent the optical power from abruptly changing from the value of the central optical portion 16 to that of the peripheral optical portions 18 at the boundary of the two optical portions 16, 18, to thereby effectively avoid the ghosting or double imaging.

The intermediate optical portion 60 formed between the central and peripheral optical portions 16, 18 preferably has a radial dimension or width of 0.1–2.0 mm. If the radial width is smaller than 0.1 mm, the intermediate optical portion 60 may not provide the intended effect. On the contrary, if the radial width of the intermediate optical portion 60 is larger than 2.0 mm, the size of the near and distant vision correction regions would be undesirably small for observing the objects. In this case, the amount of light incident upon the contact lens through these vision correction regions tends to be insufficient for correcting the near and distant visions of the lens user.

In the contact lens 58 of the above fifth embodiment of the invention, the intermediate optical portion 60 has a generally annular configuration whose geometrical and optical centers are concentric with the optical center P of the optical zone 12. The configuration of the intermediate optical portion 60 is not particularly limited, provided its optical center lies on the optical center P of the optical zone 12. For instance, the intermediate optical portion 60 may be formed to have an elliptical annular shape, depending upon the configurations of the central and peripheral optical portions 16, 18. Further, the optical power distribution of the intermediate optical portion 60 is determined such that the intermediate optical portion 60 provides the optical power intermediate between the values of the central and peripheral optical portions 16, 18. For example, the optical power of the intermediate optical portion 60 may change in steps in the diametric direction of the contact lens, or change continuously in the diametric direction. The intermediate optical portion 60 has a back surface 61 which partially provides the back surface 22 of the optical zone 12 and whose shape in cross section parallel to the diametric direction of the contact lens is determined depending upon the optical power distribution as described above.

In the above second through the fifth embodiments wherein the central optical portion 16 has a generally circular configuration, the diameter of the central optical portion 16 is preferably 0.6–3.0 mm, more preferably 1.0–2.6 mm, as in the first embodiment.

Figure 9:
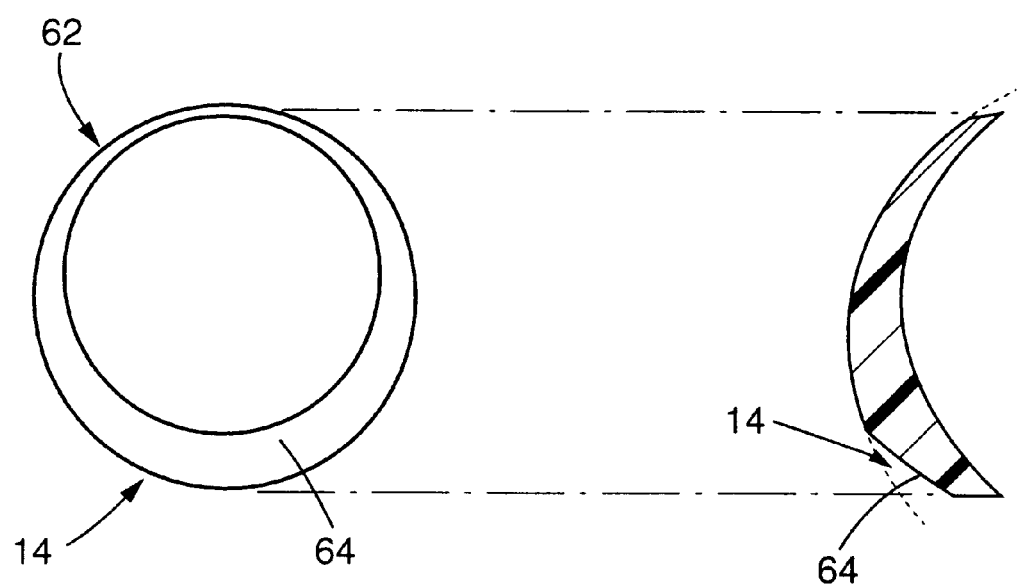
FIG. 9 is a combination of a plan view and a side elevational view in cross section showing one example of rotation preventive means formed on the contact lens.

The contact lens constructed according to the present invention may be provided with suitable rotation preventive means for preventing rotational displacement of the contact lens in its circumferential direction on the cornea, so as to assure easy positioning of the contact lens on the cornea with a predetermined circumferential orientation. As such rotation preventive means, a prism ballast mechanism may be employed. The contact lens which employs the prism ballast mechanism has a gravity center at a relatively lower portion thereof, by offsetting, in the downward direction of the lens, the centers of the front and back surfaces from each other. The non-optical portion 14 may be subjected to a cutting operation to reduce the thickness of the lens at that portion, to thereby provide a so-called "slab-off" area. In the contact lens 54 of FIGS. 6 and 7, the non-optical portions 14, 14 located at its upper and lower portions, respectively, are formed to provide thin-walled or slab-off areas 55, 55, which are positioned at the upper and lower eyelids of the the lens user when the contact lens 54 is worn on the user's eye, to thereby assure increased stability of positioning of the lens 54 on the user's eye. When the prism ballast mechanism is employed as the rotation preventive means, the thickness of the contact lens is increased at its peripheral portion. In view of this, the peripheral portion of the contact lens is subjected to a cutting operation to form the above-described slab-off area. For instance, the contact lens 62 shown in FIG. 9 is formed with a slab-off area 64 to reduce the thickness of the lens at the non-optical portion 14. That is, the contact lens 62 employs, as the rotation preventive means, both of the prism ballast mechanism and the slab-off area.

When the contact lens 10 constructed according to the above first embodiment is worn on the lens user's eye, the back surface 22 of the optical zone 12 is held in close contact with the corneal surface 31 at the radially inner region 32 of the central optical portion 16 and at the radially outer region 34 of the peripheral optical portion 18. According to this arrangement, the tear lens 40 having an annular configuration and a generally triangular cross sectional shape as seen in FIG. 3(b) is formed between the back surface 22 of the optical zone 12 and the corneal surface 31. The back surface 22 of the optical zone 12 may be formed such that the back surface 22 is held in close contact with the corneal surface 31 only at the radially outer region 34 of the peripheral optical portions 18, to thereby form a generally circular tear lens.

In the preceding embodiments, the degree of curvature of the central portion 24 of the back surface 22 is made smaller than that of the peripheral portion 26 of the back surface 22 in all diametric directions of the contact lens, and these degrees of curvature of the central and peripheral portions 24, 26 of the back surface 22 are made constant in all diametric directions of the contact lens. According to this arrangement, the clearance 36 (the tear lens 40) formed between the back surface 22 of the contact lens and the corneal surface 31 upon wearing of the contact lens on the lens user's eye extends continuously in the circumferential direction of the contact lens over a constant radial distance. When the contact lens has a toric portion, the tear lens 40 may be formed into other shapes. For instance, the tear lens 40 may have a radial width which changes in the circumferential direction of the contact lens. Alternatively, the tear lens 40 may be constituted by a plurality of arcuate sections which are spaced apart from each other in the circumferential direction of the lens.

It is not necessary that the degrees of curvature of the front and back surfaces 27, 28 of the non-optical zone 14 are made different from those of the front surface 20 of the optical zone 12 and the peripheral portion 26 of the back surface 22 of the optical zone 12, respectively. The degrees of curvature of the front and back surfaces 27, 28 of the non-optical zone 14 need not be constant in all diametric directions of the contact lens. For instance, the non-optical zone 14 may be formed with the slab-off area. Further, at least a portion of the back surface 28 of the non-optical zone 14 may have a curvature equal to that of the peripheral portion 26 of the back surface 22 of the optical zone 12, so that the corresponding portion of the back surface 28 of the non-optical zone 14 functions as a part of the base curved surface. For instance, a portion of the back surface 28 of the non-optical zone 14 adjacent to the peripheral portion 26 of the back surface 22 of the optical zone 12 may have a curvature equal to that of the peripheral portion 26 of the back surface 22 of the optical zone 12. Alternatively, the entire portion of the back surface 28 of the non-optical zone 14 may have a curvature equal to that of the peripheral portion 26 of the back surface 22 of the optical zone 12. The front and back surfaces 27, 28 of the non-optical zone 14 may have different degrees of curvature in different diametric directions of the contact lens.

It is noted that the contact lenses constructed according to the above forms of the invention provide advantages similar to those of the contact lens 10 of the first embodiment of the invention.

It is to be understood that the present invention is not limited to the details of the illustrated embodiments, but may be embodied with various changes, modifications and improvements, which may occur to those skilled in the art, without departing from the scope of the invention defined in the attached claims.

EXAMPLE 1

One example of the presbyopia correction contact lens shown in FIGS. 1–3 was designed according the present method described above. The distribution of the optical power (D: diopter) of the designed contact lens is shown in a graph of FIG. 10(a), while the distribution of the optical power of the tear lens which is to be formed when the contact lens is worn on the user's eye is shown in a graph of FIG. 10(b). Further, the distribution of the optical power provided by combination of the optical powers of the contact lens and the tear lens is shown in a graph of FIG. 10(c). The diameter of the pupil of the eye on which the contact lens is worn was 4.0 mm. The diameter of the central optical portion of the contact lens was 2.0 mm. In other words, the boundary between the central and peripheral optical portions was located at a radial point which is distant from the center of the lens by a radial distance of 1.0 mm. The back surface of the optical zone of the contact lens was held in close contact with the corneal surface at the radially inner region of the central optical portion (i.e., in a circular area having a center on the center of the lens and a radius of 0.5 mm), and at the radially outer region of the peripheral optical portion (i.e., in an annular area having a center on the center of the lens, an inner periphery having a radius of 1.5 mm and an outer periphery located at a boundary of the peripheral optical portion and the non-optical zone, that is, an outer periphery defined by the outer periphery of the peripheral portion of the back surface of the optical zone. In other words, the optical power of the tear lens was approximated to zero at those regions. The optical power of the contact lens was designed such that its distant vision correction power is 0.00 D, and such that the near vision correction power is +3.00 D. The radius of curvature of the corneal surface on which the contact lens is placed was 8.0 mm.

As is apparent from the graph of FIG. 10(a), the optical power provided only by the contact lens changes abruptly at the boundary of the central and peripheral optical portions from the near vision correction power to the distant vision correction power. However, by utilizing the optical power distribution of the tear lens indicated in the graph of FIG. 10(b), the contact lens as placed on the lens user's eye provides an optical power intermediate between the near vision correction power of the central optical portion and the distant vision correction power of the peripheral optical portion, at and adjacent to the boundary of the central and peripheral optical portions, as indicated by "X" in the graph of FIG. 10(c). Accordingly, the optical power of the contact lens changes smoothly from the near vision correction power of the central optical portion to the distant vision correction power of the peripheral optical portion.

EXAMPLE 2

A bi-focal soft contact lens for correcting presbyopia shown in FIGS. 1–3 was designed according to the present method, and was produced by forming its opposite surfaces by a molding operation. The diameter of the optical zone was 8.0 mm and the diameter of the central optical portion was 2.0 mm.

As comparative examples, two bi-focal soft contact lenses Nos. 1 and 2 were produced by forming the opposite surfaces by molding. Described in detail, in the comparative soft contact lens No. 1, the back surface of the optical zone has a single curvature (base curve) corresponding to that of the corneal surface, while the front surface of the optical zone has two concentric regions having respective different radii of curvature. In the comparative soft contact lens No. 2, the back surface of the optical zone has two concentric regions corresponding to the central and peripheral optical portions and having respective different radii of curvature, so that the central optical portion is used as the distant vision correction region while the peripheral optical portion is used as the near vision correction region. In these comparative soft contact lenses Nos. 1 and 2, too, the diameter of the optical zone was 8.0 mm and the diameter of the central optical zone was 2.0 mm.

Clinical tests were effected on the thus prepared contact lenses to evaluate the wearing comfort felt by the patient, the optical performance, i.e., the capability to prevent the ghosting or double imaging and the flare, and the stability of the optical power of each lens during use on the patient's eye. The results of evaluation are indicated in the following table. The table also indicates results of evaluation of the manufacturing cost when the contact lenses are produced by a molding operation wherein both of the opposite surfaces of the lenses were formed by molding.

| evaluation items | contact lens of the present invention | comparative contact lens No. 1 | comparative contact lens No. 2 |
|---|---|---|---|
| wearing comfort comfort | acceptable | excellent | poor |
| stability of the optical power | excellent | excellent | poor |
| prevention of ghosting | excellent | poor | poor |
| prevention of flare | excellent | poor | excellent |
| manufacturing cost | low | high | low |

As is clear from the results in the above table, the contact lens according to the present invention showed a good wearing comfort, and the optical power during its use on the patient's eye was constantly stable. Further, the problems of the ghosting or double imaging and the flare were minimized or avoided in the present contact lens, so that the present contact lens assured the lens user of clear viewing of the objects. In addition, the present contact lens was produced at a relatively low cost with a reduced number of the molds used in the molding operation for forming its opposite surfaces.

In contrast, the comparative contact lens No. 1 suffered from the ghosting or double imaging and the flare, failing to assure clear viewing of the objects. When the opposite surfaces of the comparative contact lens No. 1 were formed by molding, a large number of different molds had to be prepared, undesirably pushing up the cost of the contact lens manufacture. The comparative contact lens No. 2 suffered from a deteriorated wearing comfort. Further, the optical power of the contact lens during its use on the patient's eye was unstable due to the tear lens. In addition, the ghosting or double imaging was detected.

As is clear from the above description, the presbyopia correction contact lens according to the present invention wherein the difference between the degrees of curvature of the central and peripheral optical portions is made small does not cause deformation of the cornea following the back surface of the optical portion. Accordingly, the present contact lens is free from deterioration of the wearing comfort felt by the lens user, and effectively prevents corneal trouble. In the present contact lens wherein the optical power provided by the tear lens can be made small, the optical power of the contact lens is inhibited from abruptly changing at and near the boundary of the central and peripheral optical portions, so that the present contact lens assures an excellent vision correction performance with high stability. The presbyopia correction contact lens designed according to the present method is less likely to suffer from the ghosting or double imaging and the flare, assuring a high degree of clearness of the images of both of the near and distant objects observed through the central and peripheral optical portions, respectively. Further, the present method of producing the presbyopia correction contact lens permits its manufacture at a relatively low cost.

What is claimed is:

1. A presbyopia correction contact lens including an optical zone which consists of a substantially circular central optical portion and an annular peripheral optical portion which is radially outwardly of said central optical portion, said central and peripheral optical portions having respectively determined mutually different optical power values, so that said central and peripheral optical portions provide one and the other of a near vision correction region and a distant vision correction region, respectively, wherein the improvement comprises:

said central optical portion providing said near vision correction region while said peripheral optical portion provides said distant vision correction region, said optical zone including a front surface having a generally arcuate configuration with a substantially constant degree of curvature in cross section taken in a plane parallel to a diametric direction of said contact lens, and a back surface consisting of a central portion corresponding to said central optical portion and a peripheral portion corresponding to said peripheral optical portion, said central portion of said back surface having a generally arcuate configuration with a substantially constant degree of curvature in cross section taken in said plane, which curvature is made smaller in all diametric directions of said contact lens than that of said peripheral portion of said back surface, said back surface of said optical zone being formed so as to be spaced apart from a corneal surface of an eye of a lens user at and in the vicinity of a boundary between said central and peripheral optical portions, so as to form a clearance between said back surface and the corneal surface, which clearance has a predetermined radial width corresponding to adjacent radial end sections of said central and peripheral optical portions.

2. A presbyopia correction contact lens according to claim 1, wherein said back surface of said optical zone is formed so as to be held in close contact with the corneal surface at a radially inner region of said central optical portion and a radially outer region of said peripheral optical portion.

3. A presbyopia correction contact lens according to claim 1, wherein either one of said front surface and said back surface of said optical zone has a toric portion corresponding to at least one of said central and peripheral optical portions.

4. A presbyopia correction contact lens according to claim 1, wherein said central optical portion has a diameter of 0.6–3.0 mm.

5. A presbyopia correction contact lens according to claim 1, wherein said optical zone has an optical center which is offset by a distance of not larger than 2.0 mm from a vertical line passing a geometrical center of said contact lens, in a direction toward a side portion of said contact lens, which side portion is to be located on the side of a nose of said lens user when said contact lens is worn on said eye of said lens user.

6. A presbyopia correction contact lens according to claim 1, including rotation preventive means for preventing said contact lens from rotating on said corneal surface while said contact lens is worn on said eye of said lens user.

7. A method of designing a presbyopia correction contact lens as defined in claim 1, comprising the steps of:

calculating an optical power value of a tear lens, wherein said tear lens is formed in the clearance between said back surface of said optical zone of said contact lens and the corneal surface, the clearance being filled with a tear fluid when said contact lens is worn on an eye of a lens wearer; and determining said optical power values of said central and peripheral optical portions by taking into account said optical power value of said tear lens, so that said contact lens and said tear lens cooperate to provide a desired optical power distribution.

8. A method of producing a presbyopia correction contact lens as defined in claim 1, comprising a step of molding at least one of said front and back surfaces of said optical zone.

9. A method of designing a presbyopia correction contact lens as defined in claim 1, comprising the steps of:

calculating an optical power value of a tear lens, wherein said tear lens is formed in a clearance between said back surface of said optical zone of said contact lens and the corneal surface, with said clearance being filled with a tear fluid when said contact lens is worn on an eye of a lens wearer;

determining said optical power values of said central and peripheral optical portions by taking into account said optical power of said tear lens, so that said contact lens and said tear lens cooperate to provide a desired optical power distribution; and designing said back surface of said optical zone such that said tear lens is to be formed between said back surface and the corneal surface at and in the vicinity of said boundary of said central and peripheral optical portions, so as to have a predetermined radial width corresponding to said adjacent radial end sections of said central and peripheral optical portions, and such that said contact lens cooperates with said tear lens to provide, at said boundary, an optical power value which is intermediate between said mutually different optical power values of said central and peripheral optical portions.

10. A method of producing a presbyopia correction contact lens as defined in claim 9, comprising a step of molding at least one of said front and back surfaces of said optical zone.

11. A presbyopia correction contact lens including an optical zone which consists of a substantially circular central optical portion, an annular peripheral optical portion which is radially outwardly of said central optical portion, and an intermediate optical portion located between said central and peripheral optical portions, said central and peripheral optical portions having respectively determined mutually different optical power values, so that said central and peripheral optical portions provide one and the other of a near vision correction region and a distant vision correction region, respectively, said intermediate optical portion providing an optical power value which is intermediate between said mutually different optical power values of said central and peripheral optical portions, wherein the improvement comprises:

said central optical portion providing said near vision correction region while said peripheral optical portion provides said distant vision correction region, said optical zone including a front surface having a generally arcuate configuration with a substantially constant degree of curvature in cross section taken in a plane parallel to a diametric direction of said contact lens, and a back surface consisting of a central portion corresponding to said central optical portion and a peripheral portion corresponding to said peripheral optical portion, said central portion of said back surface having a generally arcuate configuration with a substantially constant degree of curvature in cross section taken in said plane, which curvature is made smaller in all diametric directions of said contact lens than that of said peripheral portion of said back surface, said back surface of said optical zone being formed so as to be spaced apart from a corneal surface of an eye of a lens user at and in the vicinity of a boundary between said central and peripheral optical portions, so as to form a clearance between said back surface and said corneal surface, which clearance has a predetermined radial width corresponding to adjacent radial end sections of said central and peripheral optical portions; and said intermediate optical portion having a radial width of 0.1 . 2.0 mm.

12. A presbyopia correction contact lens according to claim 11, wherein said back surface of said optical zone is formed so as to be held in close contact with the corneal surface at a radially inner region of said central optical portion and a radially outer region of said peripheral optical portion.

13. A presbyopia correction contact lens according to claim 11, wherein either one of said front surface and said back surface of said optical zone has a toric portion corresponding to at least one of said central and peripheral optical portions.

14. A presbyopia correction contact lens according to claim 11, wherein said central optical portion has a diameter of 0.6–3.0 mm.

15. A presbyopia correction contact lens according to claim 11, wherein said optical zone has an optical center which is offset by a distance of not larger than 2.0 mm from a vertical line passing a geometrical center of said contact lens, in a direction toward a side portion of said contact lens, which side portion is to be located on the side of a nose of the lens user when said contact lens is worn on the eye of the lens user.

16. A presbyopia correction contact lens according to claim 11, including a rotation preventive means for preventing said contact lens from rotating on the corneal surface while said contact lens is worn on the eye of the lens user.

17. A method of producing a presbyopia correction contact lens as defined in claim 11, comprising a step of molding at least one of said front and back surfaces of said optical zone.

\* \* \* \* \*